Oct. 20, 1970  W. C. WALLACE ET AL  3,534,987
HIGH STRENGTH FITTING
Filed Nov. 21, 1968  2 Sheets-Sheet 1
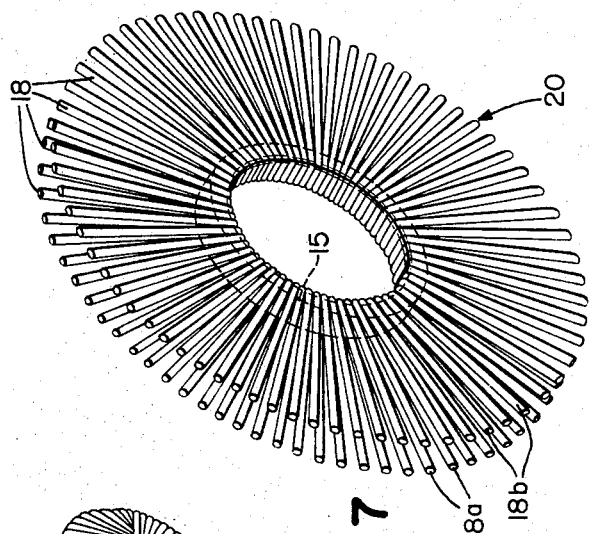
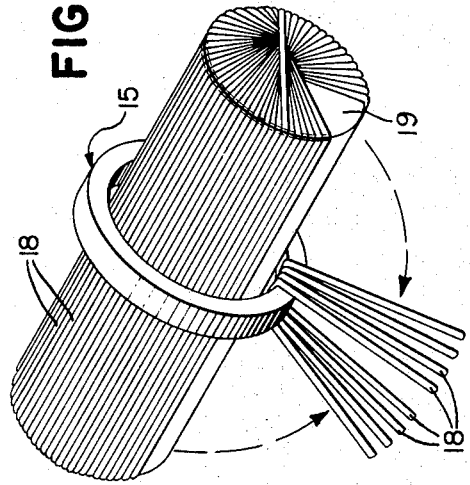
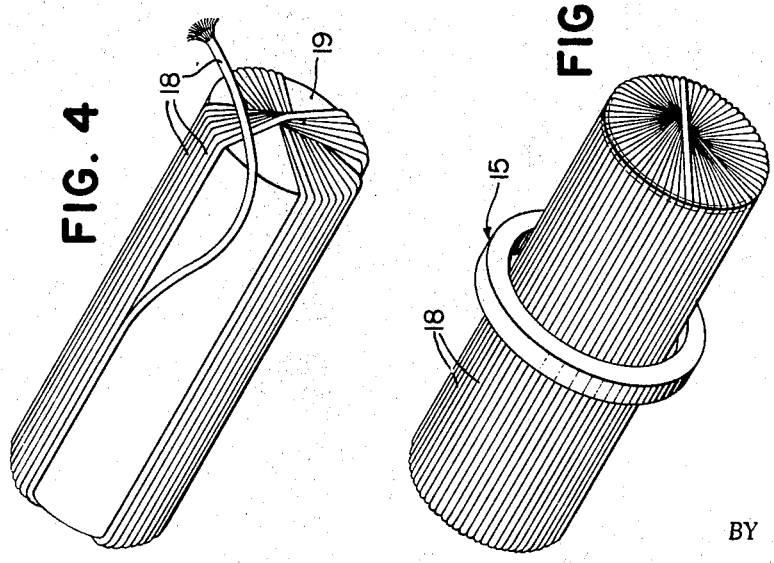
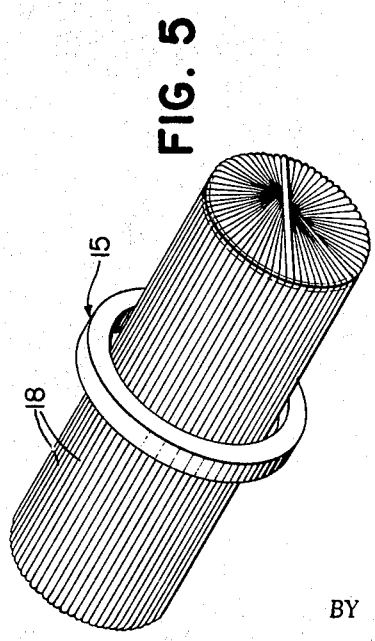
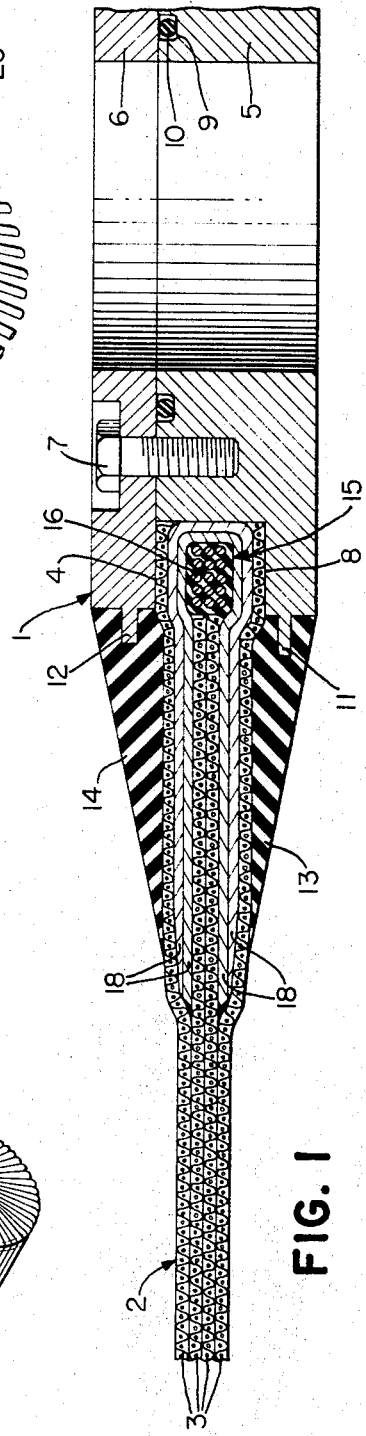
INVENTORS
ROBERT W. BUCHER
WILLARD C. WALLACE
BY
ATTORNEY

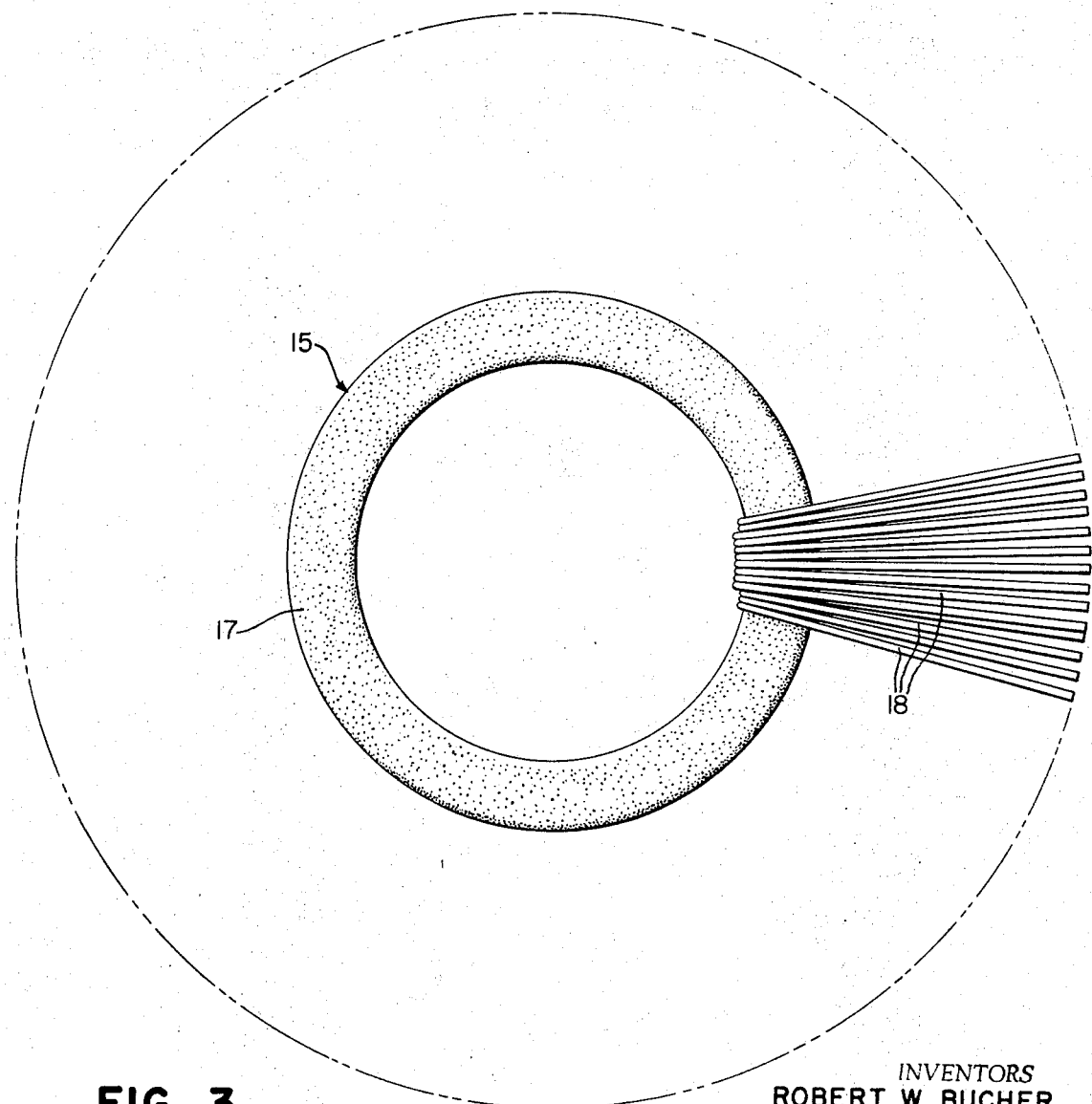

United States Patent Office 3,534,987
Patented Oct. 20, 1970

3,534,987
HIGH STRENGTH FITTING
Willard C. Wallace, Suffield, and Robert W. Bucher, Wadsworth, Ohio, assignors to The Goodyear Tire & Rubber Company, Akron, Ohio, a corporation of Ohio
Filed Nov. 21, 1968, Ser. No. 777,811
Int. Cl. F16l 5/00
U.S. Cl. 285—200
9 Claims

ABSTRACT OF THE DISCLOSURE

A fitting attached to an aperture in a flexible walled container such as a crash-resistant, self-sealing fuel tank or the like which requires a high strength leakproof joint between the container wall and the fitting to prevent pullout of the fitting when the tank is subjected to high impact loads. A reinforced bead ring is constructed of coiled wire embedded in a matrix of elastomeric material. Strands of cord or other similar material are looped around the bead ring with the free ends of the cords extending radially outwardly. The bead ring with the cords thereon is then assembled in the aperture of the tank wall with the cords being interspersed between layers of the tank wall. A pair of rigid rings, preferably of metal, are clamped together in face-to-face relationship at each side of the bead ring. Each rigid ring has a folded wedge-shaped filler ring of elastomeric material on the outer circumference thereof which is bonded to the wall of the container when the rings are clamped together on each side of the bead ring.

---

This invention relates to a high strength leakproof fitting for a flexible walled liquid container such as a crash-resistant fuel tank in which it is required that the fitting will not pull loose from the wall of the tank when the tank is subjected to high impact loads.

BACKGROUND OF THE INVENTION

In the past, many kinds of fittings have been devised for attachment to the flexible wall of fuel tanks at various apertures in the tank such as access openings, filler inlet tubes and fuel outlet lines. The problem encountered is to obtain a strong leakproof joint between a rigid fitting and a flexible wall of the fuel tank. One of the common disadvantages of many of the joints known in the prior art is that in most cases holes were required in the wall of the tank to permit bolts or other fastenings to actually pass through the tank wall adjacent the edge of the aperture. To put such fastener holes in the tank wall requires additional labor and makes the tank more expensive. In addition, such holes will weaken the tank wall and under severe stress, the tank wall may tend to tear out in the area of the holes. Another disadvantage of using such holes through the tank wall is that any wicking of fuel between the tank walls and the fittings may tend to seep out through the holes and create a fire hazard or other problems. Recently, there has been much attention given to developing crash-resistant fuel tanks for aircraft and other vehicles which will not rupture when subjected to high impact loads such as may be encountered during a crash of the vehicle. Merely developing a crash-resistant tank wall will not solve the problem of fires and explosions during crashes unless the tank fittings can be joined to the tank wall with sufficient strength they will not pull out and thereby cause loss of the fuel through the apertures of the tank.

OBJECTS OF THE INVENTION

It is a primary object of this invention to provide a joint between a fitting and a fuel tank wall which is of sufficient strength to prevent the fitting from pulling loose from the tank wall when it is subjected to high impact loads.

Another object of the invention is to provide a simple leakproof, high-strength joint between a rigid fitting and a flexible wall of a fuel tank which does not require connection holes in the container wall.

A still further object of this invention is to provide a joint which is easy to manufacture and easy to assemble.

These and other objects of the invention will become more fully apparent as the description proceeds in the following specifications and the attached drawings.

BRIEF DESCRIPTION OF THE DRAWINGS

FIG. 1 is a fragmentary cross-sectional view through a fuel tank fitting joined to a tank wall to provide a high-strength joint;

FIG. 2 is a cross-sectional view through a bead ring used in the embodiment shown in FIG. 1 and showing the manner in which radially outwardly extending cords are looped around the bead ring;

FIG. 3 is a plan view showing the bead ring, illustrated in FIG. 2 with some of the radially outwardly extending cords positioned on the ring; and FIGS. 4 through 7 show successive steps in the method of assembling the radially outwardly extending cords on the bead ring for use in a joint as illustrated in FIG. 1.

DESCRIPTION OF PREFERRED EMBODIMENTS

Referring now to FIG. 1 of the drawings, a fitting indicated generally by the numeral 1 is attached to a fuel tank wall 2 constructed of four plies 3 of fabric-reinforced fluid impervious material. A typical ply 3 is made preferably of woven nylon cloth impregnated with nitrile rubber or urethane resin. Other cloth materials impregnated with other substances may be used provided they have the required physical properties to withstand the impact loads to which the tank may be subjected. A thickened rim portion 4 is provided around the edge of the tank aperture to which the fitting 1 is attached. The fitting 1 comprises an inner ring 5 and an outer ring 6 which are bolted together by a plurality of bolts 7. The outer ring 6 is flat while the inner ring 5 is stepped in such manner that a radially outwardly extending channel 8 is formed between the rings 5 and 6 when they are fastened together. The inner ring 5 has a groove 9 in the face adjacent the ring 6 for receiving an O-ring 10 which provides a seal between the rings 5 and 6 when they are fastened together. The rings 5 and 6 have radially outwardly extending flanges 11 and 12 on the outer circumference thereof onto which wedge-shaped filler rings 13 and 14 respectively are molded. The filler rings 13 and 14 are made preferably of nitrile rubber but may be made of other elastomeric materials. The thickened rim portion 4 is formed with a center bead ring 15 reinforced with coiled wire 16 molded in a matrix 17 which holds the wires 16 in proper relationship. The coiled wire 16 is made preferably from a single continuous length of wire but may be made of more than one piece of wire if desired. The bead ring 15 serves as an anchor means for a plurality of radially outwardly extending cords 18 which serve as a tentacle-like fastening web or layer to which the plies 3 of the tank wall 2 may be securely attached. As shown in FIG. 1, the cords 18 pass around the bead ring 15 and are interposed between the layers 3 for a certain distance in a radially outward direction from the bead ring 15. In the embodiment shown in FIG. 1, the two center plies 3 have the free ends of the cords 18 adhered thereto. The two outer plies 3 are then positioned to overlap the cords 18 and thereby sandwich the cords between the two center plies and the two outer plies. When the rings 5 and 6 are clamped onto the rim 4, the filler rings 13 and 14 are bonded to the outer layers 3 by a suitable high-strength adhesive. The filler rings 13 and 14 prevent fuel seepage between the tank wall and the fitting, and in addition serve as a resilient reinforcement at the juncture of the tank wall 2 and the fitting 1. When the present structure illustrated in FIG. 1 is subjected to high impact loads which tend to pull the fitting away from the tank wall, the cords 18 looped around the bead ring 15 and bonded securely to the plies 3 will not pull loose from the plies and will exert a radially outward pull against the bead ring 15. The wall reinforced bead ring 15 is of sufficient strength to withstand the radially outward pull caused by such high impact loads.

Referring now to FIGS. 2 and 3, the bead ring 15 is shown separate from the entire fitting assembly with some of the radially outwardly extending cords 18 looped around the ring 15 in their normal position. A method for placing the cords 18 on the ring 15 is illustrated in succeeding steps shown in FIGS. 4 through 7.

In FIG. 4, the cords 18 are wrapped around a cylinder 19 with the cords running in an axial direction along the side of the cylinder and passing over each end thereof. The entire cylinder 19 is substantially covered by the wrapping of the cords 18. The cylinder 19 must be of a slightly smaller diameter than the bead ring 15.

After the cords 18 have been wrapped on the cylinder 19, a bead ring 15 is slid onto the cylinder 19 and positioned approximately at the axial midpoint thereof as shown in FIG. 5.

The cords 18 are then cut at each end of the cylinder 19 and folded radially outwardly from the ring 15.

The ring 15 with the cords 18 thereon are then removed from the cylinder 19 leaving a cord and ring assembly 20 as shown in FIG. 7. The cords 18 tend to form two layers 18a and 18b extending from each side of the ring. These individual layers may be interposed between layers of the container wall in a manner shown in FIG. 1.

While the cords 18 are being positioned on the ring 15 they may be coated with an adhesive or some suitable type of binder material which will stiffen the cords and tend to hold them in a radially outwardly extending pattern so that they may be easily assembled with the plies of the container wall. It should be stressed that a very high strength adhesive should be used to bind the cords 18 to the plies 3 of the container wall 2. Unless the adhesive has sufficient strength, the cords will tend to pull loose on one end and then be pulled around the ring 15 thereby permitting the entire fitting to fail. It is therefore essential that all the free ends of the cords 18 are securely bonded to the tank wall.

It should be recognized that although four plies of fabric reinforced material are shown in FIG. 1 for the purposes of illustrating the invention, it is obvious that any number of plies and other types of plies of material may be used in the construction of the tank wall without departing from the scope of the invention. The rigid rings 5 and 6 may, of course, be made from metal, plastic or any other material of sufficient strength and rigidity. The rings may be made with variations in the cross-sectional contour from that illustrated herein and so long as they form a radially outwardly extending channel in which the bead ring may be positioned, they will satisfactorily carry out the intent of the invention. Various other modifications may be made without departing from the scope of the invention.

What is claimed is:

1. A fitting for a flexible walled liquid container having an aperture surrounded by a thickened rim portion, comprising:
   (A) a pair of opposed rigid rings;
   (B) means for fastening together the rings in face-to-face relationship;
   (C) said rings defining therebetween a radially outwardly facing channel;
   (D) anchor means positioned in the channel and extending substantially around the entire channel;
   (E) a plurality of strand members separately looped over the anchor means with both ends of each strand member extending radially outwardly from the anchor means and being securely fastened to the wall of the container; and
   (F) a resilient filler ring of wedge-shaped cross section extending radially outwardly from the radially outer edge of at least one of the opposed rigid rings and adhered to the wall of the container.

2. A fitting as claimed in claim 1 wherein the means for fastening together the rings is located radially inwardly from the channel.

3. A fitting as claimed in claim 2 wherein the rings are fastened together by bolts.

4. A fitting as claimed in claim 1 wherein the anchor means is a wire reinforced bead ring.

5. A fitting as claimed in claim 1 wherein one of the rings has an auxiliary flange extending radially outwardly from the periphery thereof with said filler ring bonded thereto to provide a stranger joint between the rigid ring and the filler ring.

6. A fitting as claimed in claim 5 wherein both of the rigid rings have an auxiliary flange and a resilient filler ring bonded thereto.

7. A fluidtight, high-strength joint between a rigid fitting and an apertured wall of a flexible container comprising:
   (A) a rim portion extending around the edge of an aperture in the container wall comprising:
      (1) an anchor ring,
      (2) a plurality of cords separately looped over the anchor ring and extending radially outwardly in all directions therefrom,
      (3) said cords being securely attached to at least one layer of the container wall;
   (B) a rigid outer ring lying substantially outside the container;
   (C) a rigid inner ring lying substantially inside the container;
   (D) means fastening the inner and outer rings together in face-to-face relationship;
   (E) said rings defining therebetween a radially outwardly facing channel which is complimentary in cross section to the rim portion and holds the rim portion therein when the top and bottom rings are fastened together; and
   (F) a resilient filler ring of wedge-shaped cross section extending radially outwardly from the radially outer edge of at least one of the rigid rings and adhered to the wall of the container.

8. A fluidtight joint as claimed in claim 7 wherein the container wall comprises a plurality of fabric reinforced fluid impervious layers with the cords interposed between at least two of the layers and adhered thereto.

9. A fluidtight joint as claimed in claim 7 wherein the anchor ring is comprised of an annular wire bead molded in an elastomeric material.

References Cited
UNITED STATES PATENTS

| | | | |
|---|---|---|---|
| 1,851,758 | 3/1932 | Eger | 285—200 X |
| 2,336,552 | 12/1943 | Langford | 161—42 X |
| 2,366,442 | 1/1945 | Cunningham | 285—200 |
| 2,667,369 | 1/1954 | Harper | 285—200 X |
| 2,772,101 | 11/1956 | Smith | 285—200 |
| 3,137,020 | 6/1964 | Tilgner | 15—179 |
| 3,207,539 | 9/1965 | Hackforth | 285—200 X |

DAVID J. WILLIAMOWSKY, Primary Examiner

W. L. SHEDD, Assistant Examiner

U.S. Cl. X.R.

15—181; 150—8; 300—21

PO-1050
(5/69)

UNITED STATES PATENT OFFICE
CERTIFICATE OF CORRECTION

Patent No. 3,534,987  Dated October 20, 1970

Inventor(s) R W Bucher, W C Wallace

It is certified that error appears in the above-identified patent and that said Letters Patent are hereby corrected as shown below:

Column 1, line 26, change "folded" to --molded--.

JAN. 19, 1971

(SEAL)
Attest:

Edward M. Fletcher, Jr.
Attesting Officer

WILLIAM E. SCHUYLER, JR.
Commissioner of Patents